(12) United States Patent
Um

(10) Patent No.: US 11,409,473 B2
(45) Date of Patent: Aug. 9, 2022

(54) DATA STORAGE DEVICE AND OPERATING METHOD THEREOF

(71) Applicant: SK hynix Inc., Gyeonggi-do (KR)

(72) Inventor: Gi Pyo Um, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/236,500

(22) Filed: Apr. 21, 2021

(65) Prior Publication Data

US 2022/0171569 A1    Jun. 2, 2022

(30) Foreign Application Priority Data

Dec. 1, 2020   (KR) .................. 10-2020-0165656

(51) Int. Cl.
*G06F 3/06* (2006.01)
*G06F 12/02* (2006.01)

(52) U.S. Cl.
CPC .......... *G06F 3/0659* (2013.01); *G06F 3/0604* (2013.01); *G06F 3/0653* (2013.01); *G06F 3/0688* (2013.01); *G06F 12/0246* (2013.01); *G06F 2212/7207* (2013.01); *G06F 2212/7208* (2013.01)

(58) Field of Classification Search
CPC .... G06F 3/0659; G06F 3/0604; G06F 3/0653; G06F 3/0688; G06F 12/0246; G06F 2212/7207; G06F 2212/7208
See application file for complete search history.

(56) References Cited

U.S. PATENT DOCUMENTS

| | | | |
|---|---|---|---|
| 9,223,799 B1* | 12/2015 | Veeraswamy | G06F 16/188 |
| 10,635,431 B1* | 4/2020 | Lakshminarayanan | H04L 67/34 |
| 10,956,346 B1* | 3/2021 | Ben-Yehuda | G06F 13/4027 |
| 2011/0131375 A1* | 6/2011 | Noeldner | G06F 13/385 711/E12.001 |
| 2018/0285198 A1* | 10/2018 | Dantkale | G06F 12/0868 |
| 2019/0391755 A1* | 12/2019 | Lee | G06F 11/0727 |
| 2020/0034298 A1* | 1/2020 | Benisty | G06F 12/0873 |
| 2020/0341908 A1* | 10/2020 | Shin | G06F 12/0253 |
| 2020/0401509 A1* | 12/2020 | Hsu | G06F 12/0882 |
| 2021/0011634 A1* | 1/2021 | Tumkur Shivanand | G06F 3/0622 |
| 2021/0278985 A1* | 9/2021 | Traver | G06F 3/0659 |
| 2022/0019357 A1* | 1/2022 | Cho | G06F 21/79 |

FOREIGN PATENT DOCUMENTS

KR   10-2013-0019999   2/2013
KR   10-2020-0076534   6/2020

* cited by examiner

*Primary Examiner* — Nicholas J Simonetti
(74) *Attorney, Agent, or Firm* — IP & T Group LLP

(57) ABSTRACT

A data storage device includes a nonvolatile memory device which includes a first nonvolatile memory group including a plurality of first nonvolatile memories coupled to a first flash translation layer (FTL) core and a second nonvolatile memory group including a plurality of second nonvolatile memories coupled to a second FTL core, and a controller including the first FTL core configured to write first user data transmitted from the host device and second metadata related to second user data in one among the plurality of first nonvolatile memories and a common memory.

19 Claims, 14 Drawing Sheets

DATA STORAGE DEVICE AND OPERATING METHOD THEREOF

CROSS-REFERENCES TO RELATED APPLICATION

The present application claims priority under 35 U.S.C. § 119(a) to Korean Patent Application Number 10-2020-0165656, filed on Dec. 1, 2020, which is incorporated herein by reference in its entirety.

BACKGROUND

1. Technical Field

Various embodiments may generally relate to a semiconductor device, and more particularly, to a data storage device and an operating method thereof.

2. Related Art

Data storage devices using memory devices have no mechanical driving units and exhibit good stability, endurance, fast information access rates, and low power consumption. Such data storage devices include a universal serial bus (USB) memory device, a memory card having various interfaces, a universal flash storage (UFS) device, a solid state drive (SSD), and the like.

The data storage devices may include a plurality of independent flash translation layer (FTL) cores to provide multi-core environments. The plurality of FTL cores may operate independently. The plurality of independent FTL cores may be coupled to independent memory devices (for example, NAND flash memory devices) for read, write, and erase operations and the like.

In a multi-core environment in which high performance of two or more data storage devices may be expected by implementing a plurality of independent FTL cores in one data storage device, the operator has found a method to improve data processing performance.

SUMMARY

Embodiments of the present disclosure are provided to a data storage device with improved data processing performance in a multi-core environment configured of a plurality of independent cores and an operating method thereof.

In an embodiment of the present disclosure, a data storage device may include: a nonvolatile memory device which includes a first nonvolatile memory group including a plurality of first nonvolatile memories coupled to a first flash translation layer (FTL) core and a second nonvolatile memory group including a plurality of second nonvolatile memories coupled to a second FTL core; and a controller. The controller may include a protocol core configured to receive a command from a host device and distribute the command to one of the first FTL core and the second FTL core; the first FTL core configured to write first user data from the host device and second metadata in one among the plurality of first nonvolatile memories, and the second metadata is related to second user data stored in the plurality of second nonvolatile memories; and a common memory configured to store data transmitted from the first FTL core and the second FTL core.

In an embodiment of the present disclosure, an operating method of a data storage device may include: a first flash translation layer (FTL) core writing first user data transmitted from a host device in one of a plurality of first nonvolatile memories; the first FTL core writing first metadata related to the first user data in a common memory; and a second FTL core writing the first metadata in one of a plurality of second nonvolatile memories.

In an embodiment of the present disclosure, a data storage device may include: a nonvolatile memory device including a plurality of first nonvolatile memories and a plurality of second nonvolatile memories; and a controller. The controller may include a first flash translation layer (FTL) core configured to write first user data from a host device in one of the plurality of first nonvolatile memories; a second FTL core configured to write second user data from the host device in one of the plurality of second nonvolatile memories; and a common memory configured to store first meta associated with the first user data, wherein the first FTL core is configured to transmit a meta write request message to the second FTL core, and wherein the second FTL core is configured to write the first meta in one of the plurality of second nonvolatile memories in response to the meta write request message and transmit a meta write done message to the first FTL core after the first meta is written in one of the plurality of second nonvolatile memories.

According to the embodiments, metadata related to user data may be stored in a memory coupled to a counterpart core in a multi-core environment including a plurality of FTL cores, and thus write performance of data may be improved.

These and other features, aspects, and embodiments are described in more detail below.

BRIEF DESCRIPTION OF THE DRAWINGS

The above and other aspects, features and advantages of the subject matter of the present disclosure will be more clearly understood from the following detailed description taken in conjunction with the accompanying drawings, in which.

DETAILED DESCRIPTION

Various embodiments of the present teachings are described in detail with reference to the accompanying drawings. The drawings are schematic illustrations of various embodiments and intermediate structures. As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the spirit and scope of the present teachings as defined in the appended claims.

The present teachings are described herein with reference to cross-section and/or plan illustrations of embodiments of the present teachings. However, embodiments of the present teachings should not be construed as limiting the present teachings. Although a few embodiments of the present teachings are shown and described, it will be appreciated by those of ordinary skill in the art that changes may be made in these embodiments without departing from the principles and spirit of the present teachings.

Figure 1:
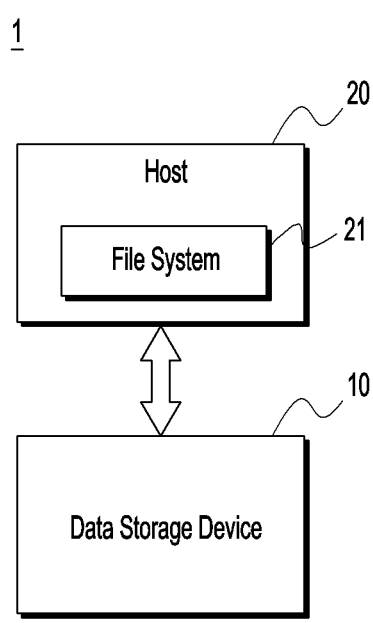
FIG. 1 is a diagram illustrating an electronic device according to embodiments of the present disclosure.

FIG. 1 is a diagram illustrating an electronic apparatus 1 according to an embodiment of the present disclosure.

Referring to FIG. 1, the electronic apparatus 1 may include a host device 20 and a data storage device 10.

The host device 20 may be an apparatus such as a mobile phone, an MP3 player, a laptop computer, a desktop computer, a game player, a television (TV), an in-vehicle infotainment system, and the like. The host device 20 may include a file system 21. Further, although not shown in FIG. 1, the host device 20 may include a processing unit (for example, central processing unit (CPU)) and a driving unit. The processing unit may control an overall operation of the host device 20 and the driving unit may drive the data storage device 10 according to control of the processing unit. In an embodiment, the driving unit of the host device 20 may include an application (not shown), the file system 21, a host memory (not shown), and the like.

The application may be referred to as an application program and may be software executed on an operating system (OS). The application may process data in response to user input. For example, the application may process user data in response to the user input and transmit a command for storing the processed user data in a nonvolatile memory device (e.g., a nonvolatile memory device 200 in FIG. 2) of the data storage device 10 to the file system 21.

The file system 21 may allocate a logical block address (LBA), in which the user data is to be stored, in response to the command transmitted from the application. In an embodiment, the file system 21 may be a flash-friendly file system (F2FS), an extended file system 4 (EXT4), or another type of file system similar thereto, but this is not limited thereto.

The host memory (not shown) may temporarily store data to be written in the nonvolatile memory device 200 of the data storage device 10 or data read out from the nonvolatile memory device 200 of the data storage device 10. The host memory may be used as a working memory configured to drive (or execute) the application, the file system 21, and the like.

The data storage device 10 may store data to be accessed by the host device 20. In some cases, the data storage device 10 may be referred to as a memory system.

The data storage device 10 may include one among various types of storage devices according to an interface protocol coupled to the host device 20. For example, the data storage device 10 may include one of various types of storage devices, such as a solid state drive (SSD), a multimedia card in the form of MMC, eMMC, RS-MMC, and micro-MMC, a secure digital card in the form of SD, mini-SD, and micro-SD, a universal serial bus (USB) storage device, a universal flash storage (UFS) device, a personal computer memory card international association (PCMCIA) card type storage device, a peripheral component interconnection (PCI) card type storage device, a PCI-express (PCI-e or PCIe) card type storage device, a compact flash (CF) card, a smart media card, a memory stick, and the like.

The data storage device 10 may be manufactured as one among various types of packages. For example, the data storage device 10 may be manufactured as any one of various types of packages, such as a package on package (POP), a system in package (SIP), a system on chip (SOC), a multi-chip package (MCP), a chip on board (COB), a wafer-level fabricated package (WFP), and a wafer-level stack package (WSP).

Figure 2:
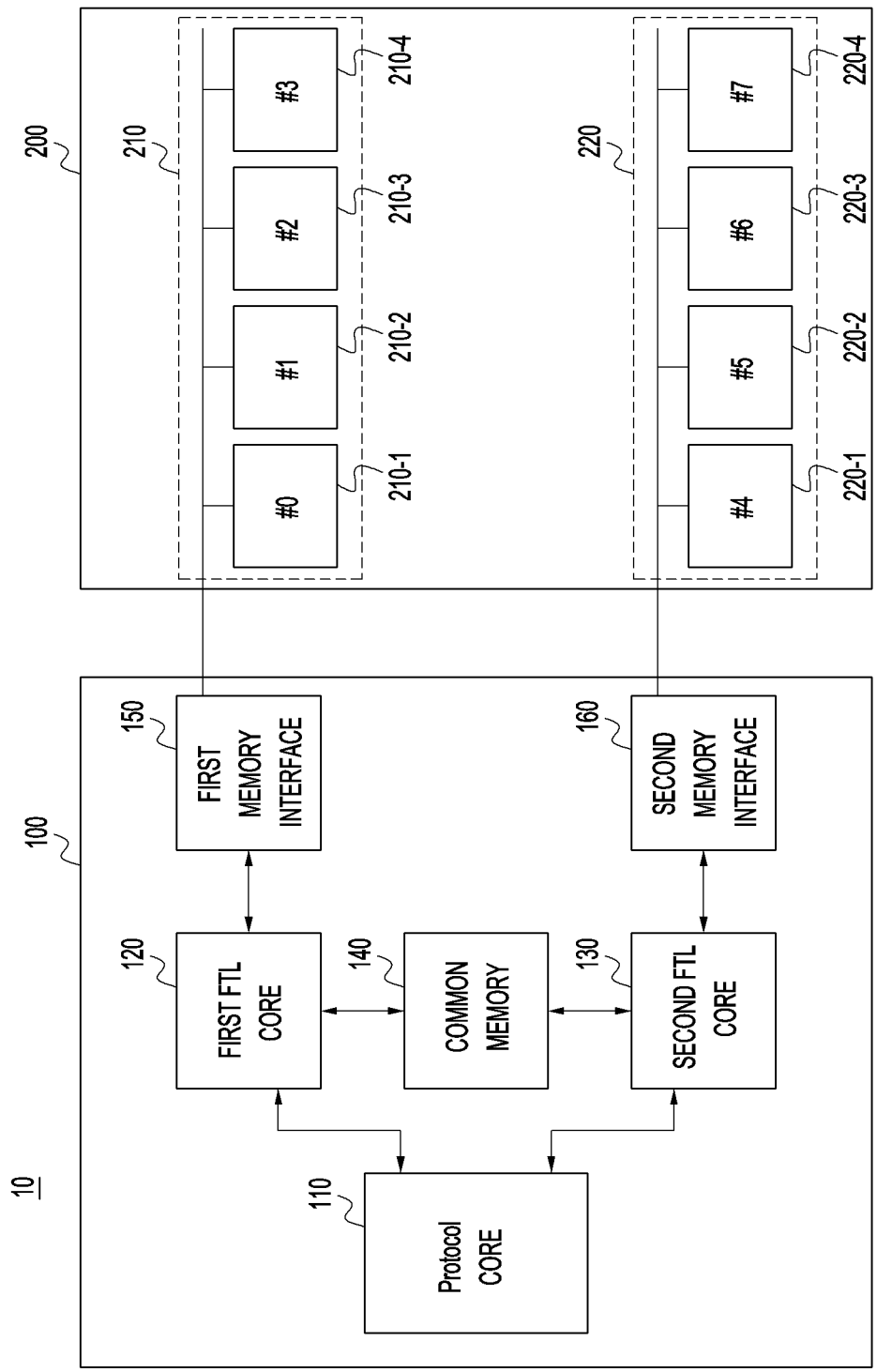
FIG. 2 is a diagram illustrating a configuration of a data storage device according to embodiments of the present disclosure.

FIG. 2 is a diagram illustrating a configuration of the data storage device 10 according to an embodiment of the present disclosure.

Hereinafter, the data storage device 10 will be described with reference to an illustrative diagram of FIG. 3 describing a data storage method according to an embodiment of the present disclosure.

The data storage device 10 may include a controller 100 and the nonvolatile memory device 200.

The nonvolatile memory device 200 may be operated as a storage medium of the data storage device 10. The nonvolatile memory device 200 may include one of various types of nonvolatile memory devices according to a memory cell, such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase-change random access memory (PRAM) using a chalcogenide alloy, and a resistive random access memory (ReRAM) using a transition metal compound.

The nonvolatile memory device 200 may include a memory cell array (not shown) including a plurality of memory cells arranged in regions in which a plurality of word lines (not shown) and a plurality of bit lines (not shown) cross each other. For example, each of the memory cells in the memory cell array may be a single-level cell (SLC) in which a single bit data (for example, 1-bit data) is to be stored, a multi-level cell (MLC) in which 2-bit data is to be stored, a triple-level memory cell (TLC) in which 3-bit data is to be stored, and a quadruple-level cell (QLC) in which 4-bit data is to be stored. The memory cell array may include at least one or more memory cells of the SLC, the MLC, the TLC, and the QLC. For example, the memory cell array 110 may include memory cells arranged in a two-dimensional (2D) horizontal structure or memory cells arranged in a 3D vertical structure.

In an embodiment, the nonvolatile memory device 200 may include a first nonvolatile memory group 210 including a plurality of first nonvolatile memories 210-1, 210-2, 210-3, and 210-4 coupled to a first FTL core 120 through a first memory interface 150 and a second nonvolatile memory group 220 including a plurality of second nonvolatile memories 220-1, 220-2, 220-3, and 220-4 coupled to a second FTL core 130 through a second memory interface 160.

Specifically, the plurality of first nonvolatile memories 210-1 to 210-4 may constitute the first nonvolatile memory group 210.

The plurality of second nonvolatile memories 220-1 to 220-4 may constitute the second nonvolatile memory group 220.

The first nonvolatile memory group 210 may be coupled to the first FTL core 120 to be described later. The first nonvolatile memories 210-1 to 210-4 in the first nonvolatile memory group 210 may store metadata of user data stored in the second FTL core 130.

The metadata may be data generated while storing the user data and include mapping table information such as a write count and address information, but the metadata is not limited thereto.

The second nonvolatile memory group 220 may be coupled to the second FTL core 130 to be described later. The second nonvolatile memories 220-1 to 220-4 in the second nonvolatile memory group 220 may store metadata of user data stored in the first FTL core 120. Detailed description therefor will be made later.

The controller 100 may control an overall operation of the data storage device 10 through driving of firmware or software loaded into a memory (not shown). The controller 100 may decode and drive a code-type instruction or algorithm such as firmware or software. The controller 100 may be implemented with hardware or a combination of hardware and software.

Although not shown in FIG. 2, the controller 100 may further include an error correction code (ECC) engine which generates a parity by performing ECC encoding on write data provided from the host device 20 and performs ECC decoding on read data read out from the nonvolatile memory device 200 using the parity. The ECC engine may be provided inside or outside the first and second memory interfaces 150 and 160.

In an embodiment, the controller 100 may include a protocol core 110, the first FTL core 120, the second FTL core 130, a common memory 140, the first memory interface 150, and the second memory interface 160.

The protocol core 110 may be configured to perform a function of a host interface and may perform interfacing between the host device 20 and the data storage device 10 in response to a protocol of the host device 20. For example, the protocol core 110 may communicate with the host device 20 through one protocol among a USB protocol, a UFS protocol, an MMC protocol, a parallel advanced technology attachment (PATA) protocol, a serial advanced technology attachment (SATA) protocol, a small computer system interface (SCSI) protocol, a serial attached SCSI (SAS) protocol, a PCI protocol, and a PCI-e protocol.

In the embodiment, the protocol core 110 may be configured to receive a command transmitted from the host device 20 and distribute the command to one of the first FTL core 120 and the second FTL core 130.

When a read command is received from the host device 20, the protocol core 110 may allow a corresponding FTL core of the first FTL core 120 and the second FTL core 130 to execute the read command based on a physical address in which user data corresponding to the read command is stored.

The first FTL core 120 may be configured of a micro control unit (MCU) and a central processing unit (CPU). The first FTL core 120 may process requests transmitted from the host device 20. To process the requests transmitted from the host device 20, the first FTL core 120 may drive a code-type instruction or algorithm (for example, firmware) loaded into a memory (not shown) and control operations of internal elements such as the protocol core 110, the common memory 140, and the first memory interface 150, and the nonvolatile memory device 200.

The first FTL core 120 may generate control signals for controlling operations of the nonvolatile memory device 200 based on the requests transmitted from the host device 20 and provide the generated control signals to the nonvolatile memory device 200 through the first memory interface 150.

The above-described operation of the first FTL core 120 may also be applied to the second FTL core 130.

Figure 3:
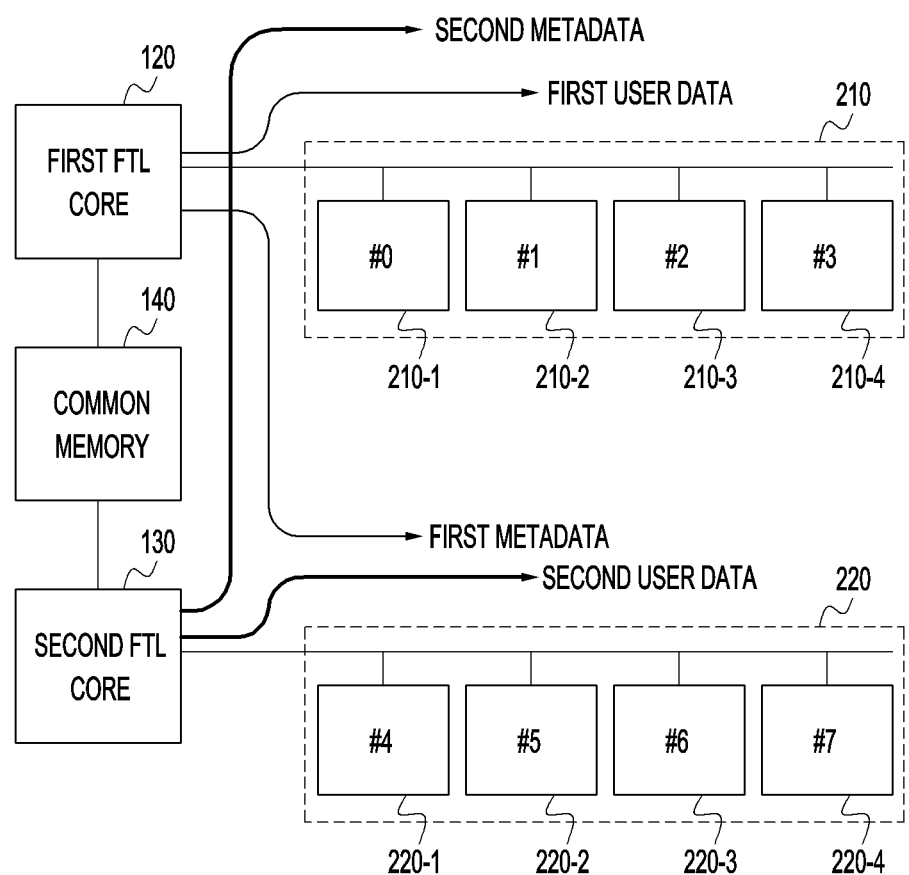
FIG. 3 is an illustrative diagram explaining a data storage method according to an embodiment of the present disclosure.

Referring to FIG. 3, the first FTL core 120 may write first user data transmitted from the host device 20 and second metadata related to second user data in one of the plurality of first nonvolatile memories 210-1 to 210-4, respectively. The second user data may be user data stored in the plurality of second nonvolatile memories 220-1 to 220-4 through the second FTL core 130.

The time that the first user data is stored by the first FTL core 120 and the time that the first metadata related to the first user data is stored by the second FTL core 130 may overlap each other. Thus, the write speed of data may be improved as compared with an existing method of storing the first metadata after the storage of the first user data is completed.

The first FTL core 120 may classify a method of storing the metadata according to a method of check the second metadata.

Figure 4:
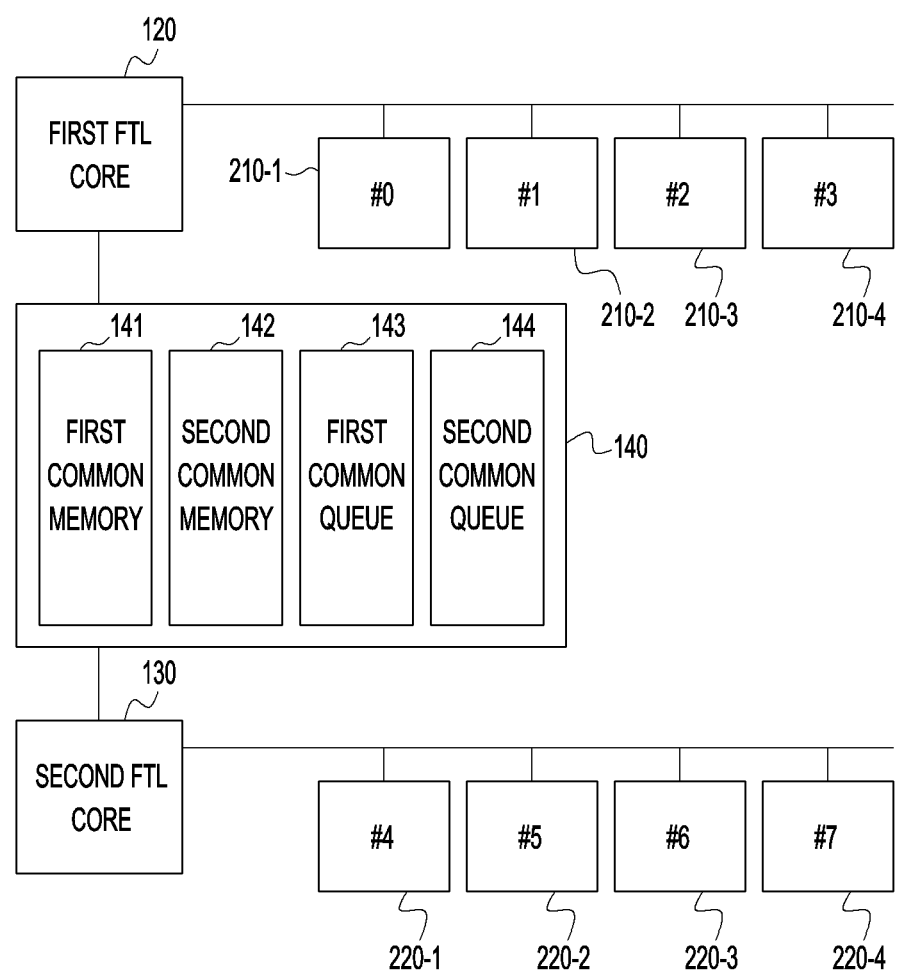
FIG. 4 is a diagram illustrating an example of a detailed configuration of a common memory according to an embodiment of the present disclosure.

FIG. 4 is a diagram illustrating an example of a detailed configuration of a common memory 140 according to an embodiment of the present disclosure. An example that the common memory 140 includes common queues will be described.

For example, referring to FIG. 4, the first FTL core 120 may check (or determine) a counting number of a write request message of the second metadata stored in a second common queue 144 every preset time.

When it is checked that the counting number is changed as a check result, the first FTL core 120 may receive, from a second common memory 142, the second metadata matching to the changed counting number and the second metadata matching to a previous counting number of non-written second metadata prior to the changed counting number and write the second metadata in one of the plurality of first nonvolatile memories 210-1 to 210-4.

For example, when the counting number of the write request message of previous second metadata is "1" and the counting number of the write request message of current second metadata is "2", the first FTL core 120 may recognize that new second metadata to be stored is generated through the change of the counting number. Next, when the second metadata for the counting number "1" is not written in the any one of the plurality of first nonvolatile memories 210-1 to 210-4, the first FTL core 120 may receive, from the second common memory 142, the second metadata matching to the changed counting number "2" and the second metadata matching to the previous counting number "1" prior to the changed counting number "2" and write the second metadata in the one of the plurality of first nonvolatile memories 210-1 to 210-4. When the second metadata matching to the previous counting number "1" prior to the changed counting number "2" is written in the any one of the plurality of first nonvolatile memories 210-1 to 210-4, the first FTL core 120 may receive only the second metadata matching to the changed counting number "2" from the second common memory 142 and write the second metadata in the one of the plurality of first nonvolatile memories 210-1 to 210-4.

When the write of the second metadata is completed, the first FTL core 120 may transmit a write done message of the second metadata to the second FTL core 130.

When a read command is received, the first FTL core 120 may request the first metadata corresponding to the read command to the second FTL core 130. For example, the first FTL core 120 and the second FTL core 130 may have promised in advance to store the counterpart's metadata therebetween. Thus, when processing the read command, the first FTL core 120 and the second FTL core 130 may request the metadata to the counterpart's FTL cores.

Referring to FIG. 3, the second FTL core 130 may write the second user data transmitted from the host device 20 and the first metadata related to the first user data in one of the plurality of second nonvolatile memories 220-1 to 220-4, respectively.

Referring to FIG. 4, the second FTL core 130 may check a counting number of a write request message of the first metadata stored in a first common queue 143 every preset time. When it is checked that the counting number is changed as a check result, the second FTL core 130 may receive, from a first common memory 141, the first metadata matching to the changed counting number and the first metadata matching to a previous counting number of non-written first metadata prior to the changed counting number and write the first metadata in one of the plurality of second nonvolatile memories 220-1 to 220-4.

When the write of the first metadata is completed, the second FTL core 130 may transmit a write done message of the first metadata to the first FTL core 120.

When a read command is received, the second FTL core 130 may request the second metadata corresponding to the read command to the first FTL core 120.

Although only two cores, for example, the first FTL core 120 and the second FTL core 130 have been illustrated in FIG. 2, a plurality of FTL cores may be implemented in addition to the first FTL core 120 and the second FTL core 130. Accordingly, the metadata generated in the FTL core itself may be stored in the counterpart's FTL core. For example, the first FTL core 120 may be referred to as a core of a side which stores user data, and the second FTL core 130 may be referred to as a counterpart core of a side which stores the metadata.

The common memory 140 may store data including the first metadata and the second metadata transmitted from the first FTL core 120 and the second FTL core 130.

The common memory 140 may be configured to be accessed by both of the first FTL core 120 and the second FTL core 130. The first FTL core 120 and the second FTL core 130 may store data in the common memory 140 not via the protocol core 110.

For example, referring to FIG. 4, the common memory 140 may include the first common memory 141, the second command memory 142, the first common queue 143, and the second common queue 144.

The first common memory 141 may store the first metadata transmitted from the first FTL core 120.

In an embodiment, the first common memory 141 may be a memory in which the first metadata is to be stored by the first FTL core 120. Then the second FTL core 130 may acquire the first metadata to be stored therein from the first common memory 141.

The second common memory 142 may store the second metadata transmitted from the second FTL core 130.

In the embodiment, the second common memory 142 may be a memory in which the second metadata is to be stored by the second FTL core 130. Then the first FTL core 120 may acquire the second metadata to be stored therein from the second common memory 142.

The first common queue 143 may store the write request message of the first metadata transmitted from the first FTL core 120. The write request message of the first metadata may be referred to as a message, which requests to write the first metadata in one of the plurality of second nonvolatile memories 220-1-220-4, to the second FTL core 130. The second FTL core 130 may check the first common queue 143 at a preset period. When it is checked that a write request for new first metadata occurs, the second FTL core 130 may receive and store the corresponding first metadata.

The second common queue 144 may store the write request message of the second metadata transmitted from the second FTL core 130. The write request message of the second metadata may be referred to as a message, which requests to write the second metadata in one of the plurality of first nonvolatile memories 210-1-210-4, to the first FTL core 120. The first FTL core 120 may check the second common queue 144 at a preset period. When it is checked that a write request for new second metadata occurs, the first FTL core 120 may receive and store the corresponding second metadata.

The write request message of the first metadata and the write request message of the second metadata may include counting numbers for identifying an occurrence of new metadata as header information.

Figure 5:
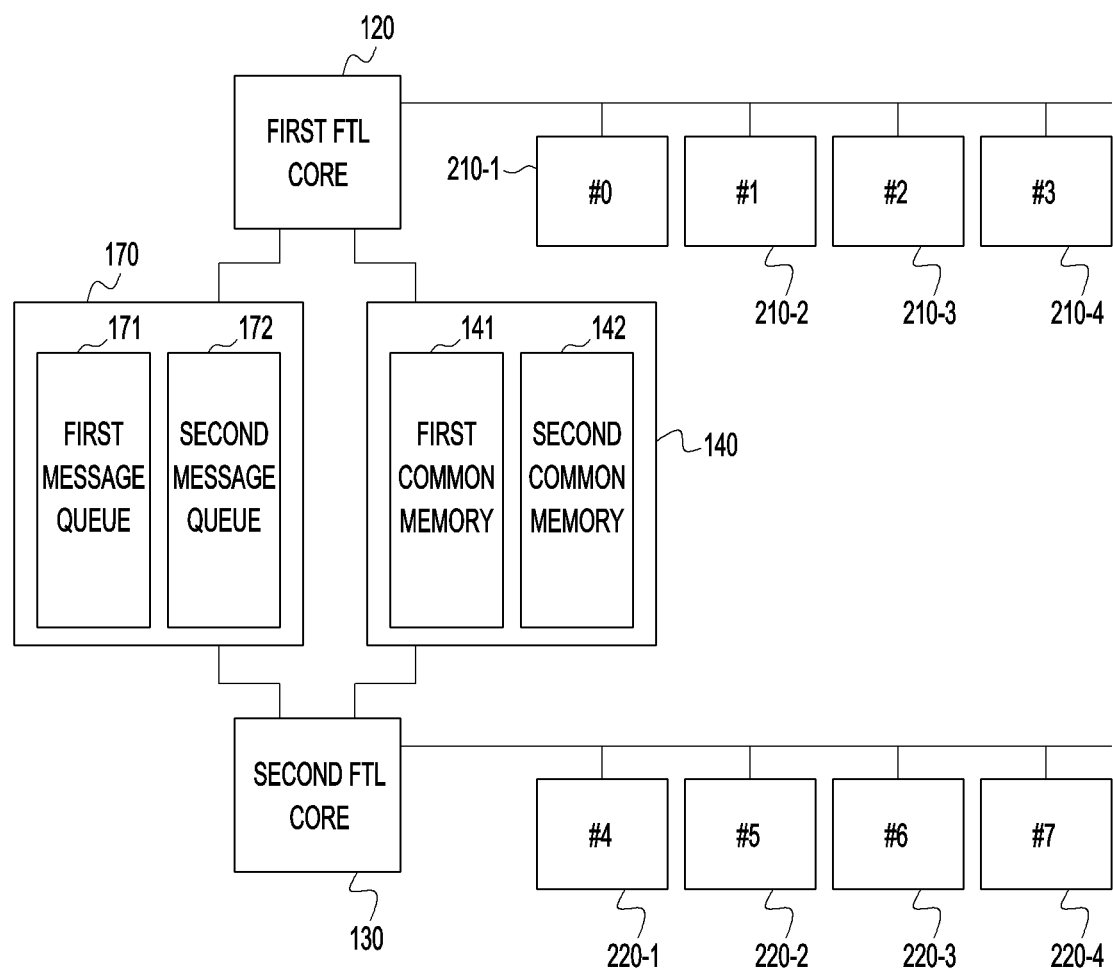
FIG. 5 is a diagram illustrating another example of a detailed configuration of a common memory according to an embodiment of the present disclosure.

FIG. 5 is a diagram illustrating another example of a detailed configuration of a common memory 140 according to an embodiment of the present disclosure. An example that a message queue is separately implemented from the common memory 140 will be described.

Referring to FIG. 5, the common memory 140 may include a first common memory 141 and a second common memory 142. Separately from the common memory 140 including the first and second common memories 141 and 142, the data storage device 10 may include a message queue 170 including a first message queue 171 and a second message queue 172.

The first common memory 141 may store the first metadata transmitted from the first FTL core 120.

The second common memory 142 may store the second metadata transmitted from the second FTL core 130.

The first message queue 171 may generate a write request interrupt and transmit the write request interrupt to the second FTL core 130 when the write request message of the first metadata transmitted from the first FTL core 120 is stored.

The second message queue 172 may generate a write request interrupt and transmit the write request interrupt to the first FTL core 120 when the write request message of the second metadata transmitted from the second FTL core 130 is stored.

The first and second message queues 171 and 172 may be implemented with message-dedicated intellectual properties (IPs) configured of hardware IPs. The first and second message queues 171 and 172 may support communication between the first FTL core 120 and the second FTL core 130 and may be referred to as mailboxes.

In an embodiment, when the write request messages of the first and second metadata are queued, each of the first and second message queues 171 and 172 may transmit the write request interrupt for notifying the queuing of the write request message to the corresponding FTL core of the first and second FTL cores 120 and 130.

Figure 6:
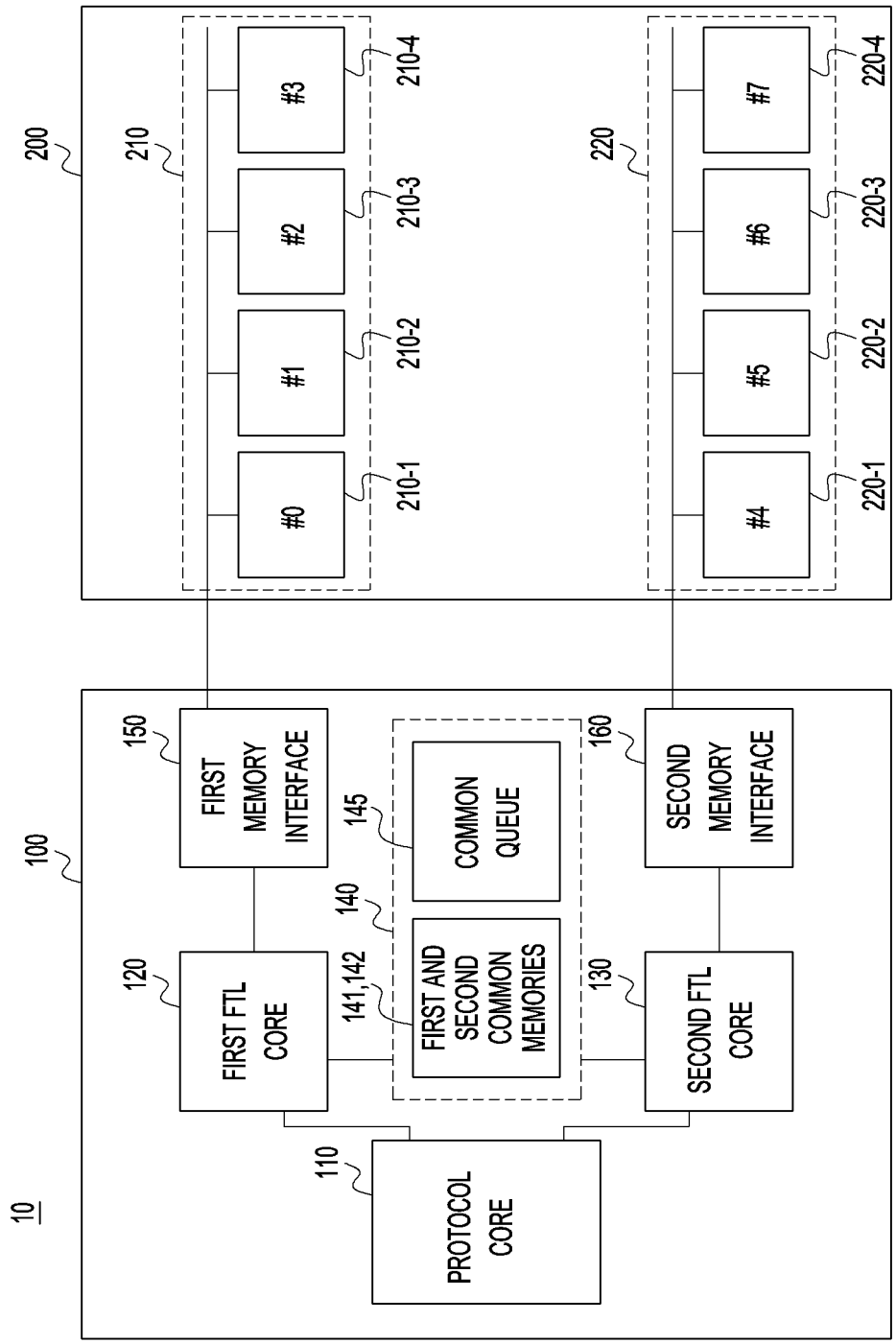
FIG. 6 is a diagram illustrating still another example of a detailed configuration of a common memory according to an embodiment of the present disclosure.

FIG. 6 is a diagram illustrating still another example of a detailed configuration of a common memory 140 according to an embodiment of the present disclosure. An example that the common queue is implemented with one queue will be described.

Referring to FIG. 6, the common memory 140 may include a first common memory 141, a second common memory 142, and a common queue 145.

The first common memory 141 may store the first metadata transmitted from the first FTL core 120.

The second common memory 142 may store the second metadata transmitted from the second FTL core 130.

The common queue 145 may store the write request message of the first metadata transmitted from the first FTL core 120 and the write request message of the second metadata transmitted from the second FTL core 130.

The common queue 145 may store the write request message of the first metadata and the write request message of the second metadata by matching identical information for identifying the write request messages.

For example, the identification information may be information for recognizing that the write request message of the corresponding metadata has to be stored in one among the plurality of first nonvolatile memories 210-1 to 210-4 in a first FTL core 120 side or information for recognizing that the write request message of the corresponding metadata has to be stored in one of the plurality of second nonvolatile memories 220-1 to 220-4 in a second FTL core 130 side. Such identification information may be promised in advance so that the corresponding meaning may be recognized.

Although not shown in FIG. 6, the common queue 145 may also be implemented not inside the common memory 140 but outside the common memory 140.

The first memory interface 150 may be located between the first FTL core 120 and the first nonvolatile memory group 210, and control the first nonvolatile memory group 210 according to control of the first FTL core 120.

The second memory interface 160 may be located between the second FTL core 130 and the second nonvolatile memory group 220 and control the second nonvolatile memory group 220 according to control of the second FTL core 130.

When the nonvolatile memory device 200 is configured of NAND flash memories, the first and second memory interfaces 150 and 160 may be referred to as a flash control top (FCT). The first and second memory interfaces 150 and 160 may transmit control signals generated through the first and second FTL cores 120 and 130 to the nonvolatile memory device 200. The control signals may include commands, addresses, operation control signals, and the like for controlling an operation of the nonvolatile memory device 200. For example, the operation control signals may include a chip enable signal, a command latch enable signal, an address latch enable signal, a write enable signal, a read enable signal, a data strobe signal, and the like, but the operation control signals are not limited thereto. Further, the first and second memory interfaces 150 and 160 may transmit write data to the nonvolatile memory device 200 or receive read data from the nonvolatile memory device 200.

The first and second memory interfaces 150 and 160 and the nonvolatile memory device 200 may be coupled through channels. The first and second memory interfaces 150 and 160 may transmit signals such as commands, addresses, operation control signals, and data (for example, write data) to the nonvolatile memory device 200 through the channels. Further, the first and second memory interfaces 150 and 160 may receive status signals (for example, ready/busy (R/B) signal), data (for example, read data), and the like from the nonvolatile memory device 200 through the channels.

Although not shown in drawings, the data storage device 10 may further include a memory including a dynamic random access memory (DRAM) or a static random access memory (SRAM), but the memory is not limited thereto. The memory may store firmware driven through the first and second FTL cores 120 and 130. The memory may store data required for driving of the firmware, for example, metadata. For example, the memory may operate as a working memory of the first and second FTL cores 120 and 130.

The memory may be configured to include a data buffer configured to temporarily store write data to be transmitted to the nonvolatile memory device 200 from the host device 20 or read data from the nonvolatile memory device 200 and to be transmitted to the host device 20. For example, the memory may operate as a buffer memory. The memory may be provided inside or outside the controller 100.

Figure 7:
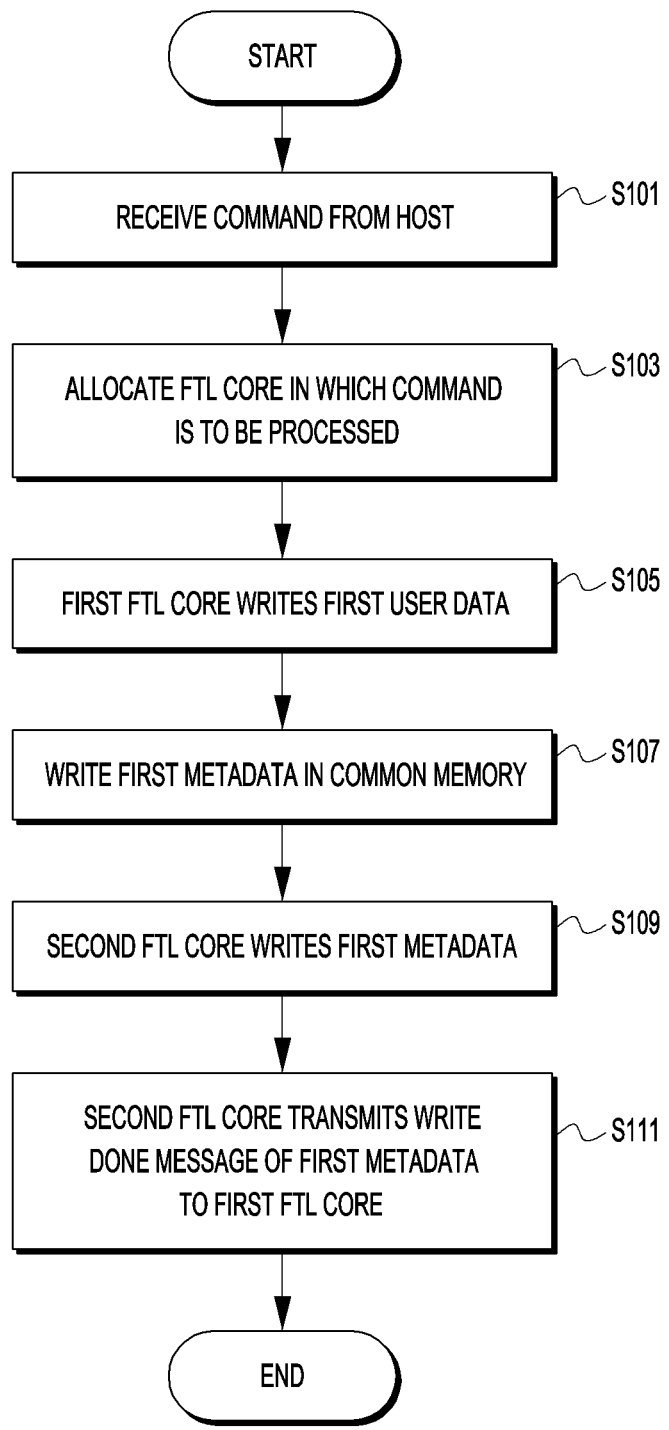
FIG. 7 is a flowchart explaining an operating method of a data storage device according to an embodiment of the present disclosure.

FIG. 7 is a flowchart describing an operating method of a data storage device 10 according to an embodiment of the present disclosure.

Referring to FIG. 7, when a command transmitted from the host device 20 is received, the protocol core 110 may allocate one of the first FTL core 120 and the second FTL core 130 as a FTL core for processing the command (S101, S103). When the command is a write request, the command may include user data to be written.

The protocol core 110 may conform to a previously set scheme such as a method of alternately allocating the FTL cores in order of the first FTL core 120 and the second FTL core 130.

Next, the first FTL core 120 may write the first user data transmitted from the host device 20 through the protocol core 110 in one of the plurality of first nonvolatile memories 210-1 to 210-4 (S105).

The first FTL core 120 may write the first metadata related to the first user data in the common memory 140 (S107). A region, in which the first metadata generated by the first FTL core 120 side is to be stored, may be separately divided in the common memory 140.

The second FTL core 130 may write the first metadata in one among the plurality of second nonvolatile memories 220-1 to 220-4 (S109).

Next, the second FTL core 130 may transmit a write done message of the first metadata to the first FTL core 120 (S111).

The example that the second FTL core 130 side stores the first metadata in operations S105 to S111 has been described. On the other hand, an example that the first FTL core 120 may store the second metadata provided from the second FTL core 130 side may be implemented.

Figure 8:
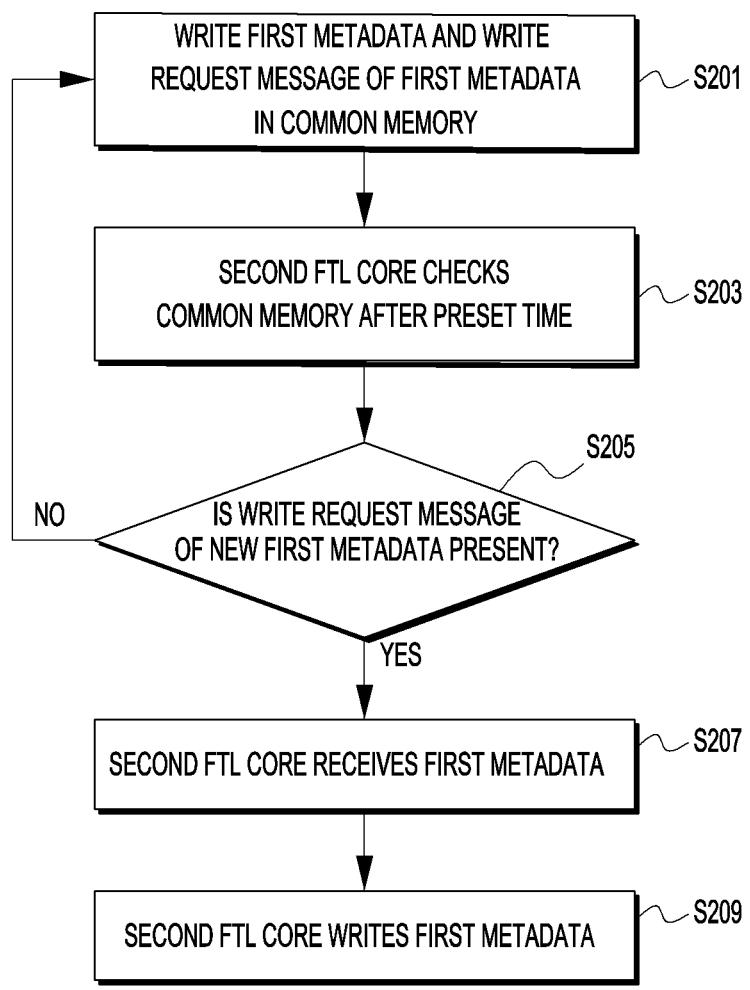
FIG. 8 is a flowchart explaining an example of a method of storing metadata of FIG. 7 according to an embodiment of the present disclosure.

FIG. 8 is a flowchart describing an example of a method of storing metadata in FIG. 7, and operations S107 to S109 in FIG. 7 will be described in detail.

Hereinafter, an example that a common memory 140 includes a common queue will be described.

In operation S107 in FIG. 7, the first FTL core 120 may write the first metadata related to the first user data and the write request message of the first metadata in the common memory 140 (S201).

The write request message of the first metadata may include a counting number for identifying an occurrence of new metadata as header information.

Next, the second FTL core 130 may check the counting number of the write request message of the first metadata stored in the common memory 140 after a preset time (S203).

When it is checked that the counting number is changed as a check result (S205, YES), the second FTL core 130 may receive, from the common memory 140, the first metadata matching to the changed counting number and the first metadata matching to a previous counting number of non-written first metadata prior to the changed counting number (S207).

When it is checked that the counting number is changed, the second FTL core 130 may recognize that a write request message of new first metadata exists.

Next, the second FTL core 130 may write the first metadata in one among the plurality of second nonvolatile memories 220-1 to 220-4 (S209).

Figure 9:
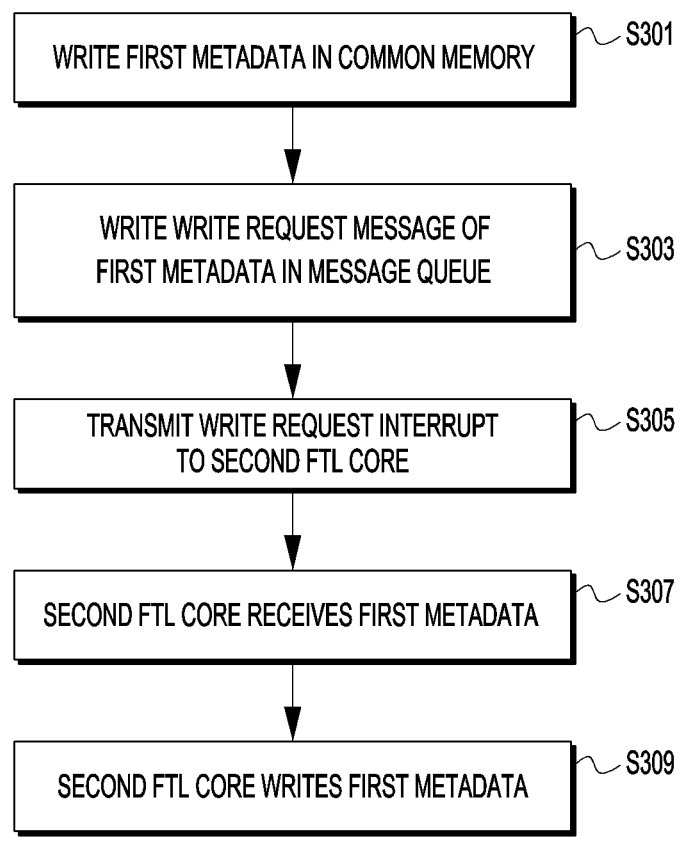
FIG. 9 is a flowchart explaining another example of a method of storing metadata of FIG. 7 according to an embodiment of the present disclosure.

FIG. 9 is a flowchart describing another example of a method of storing metadata in FIG. 7, and operations S107 to S109 in FIG. 7 will be described in detail.

Hereinafter, an example that a message queue is separately implemented from a common memory 140 will be described.

In operation S107 in FIG. 7, the first FTL core 120 may write the first metadata related to the first user data in the common memory 140 (S301).

The message queue (see 170 of FIG. 5) may store the write request message of the first metadata transmitted from the first FTL core 120 (S303).

The message queue 170 may generate a write request interrupt for the write request message of the first metadata and transmit the write request interrupt to the second FTL core 130 (S305).

The second FTL core 130 may receive the first metadata from the common memory 140 and write the first metadata in one among the plurality of second nonvolatile memories 220-1 to 220-4 (S307, S309).

Figure 10:
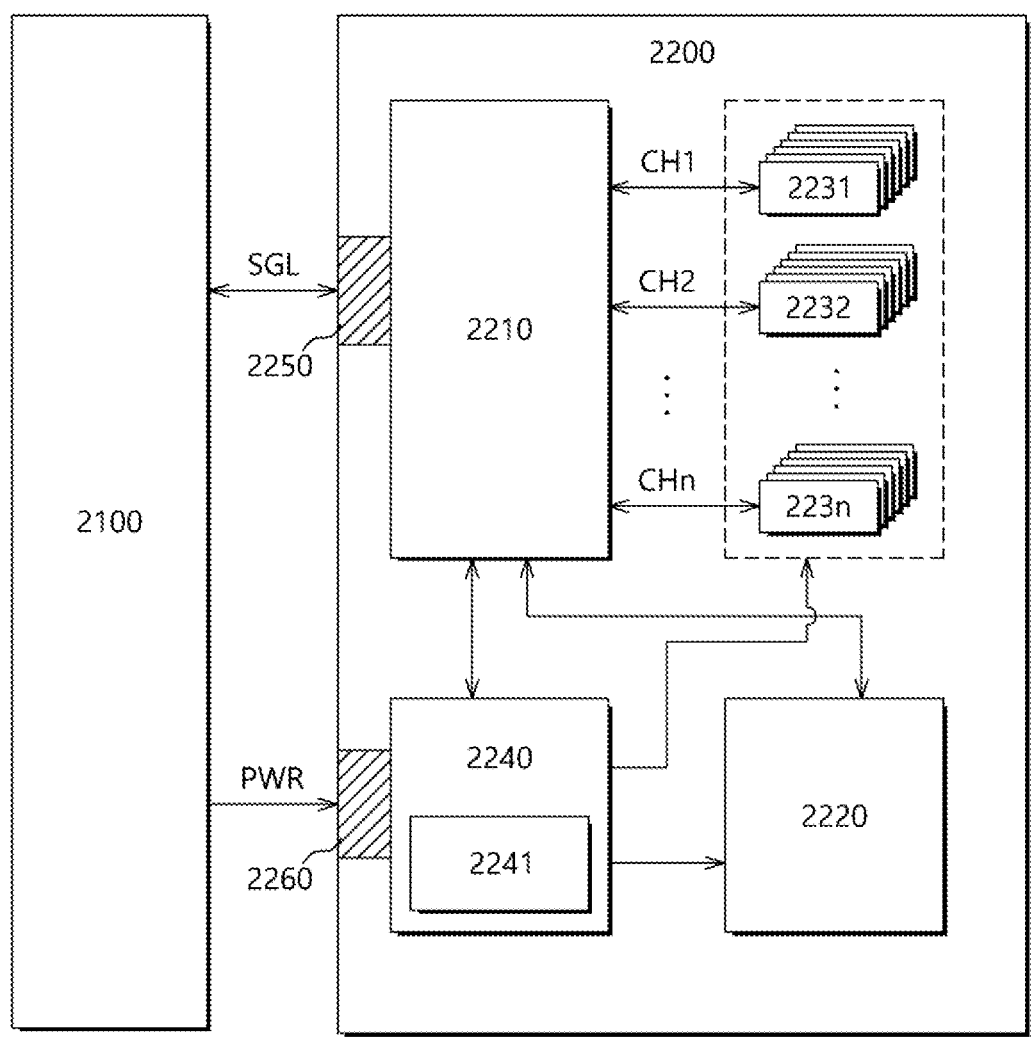
FIG. 10 is a diagram illustrating a data processing system including a solid state drive (SSD) according to an embodiment of the present disclosure.

FIG. 10 is a block diagram illustrating a data processing system 2000 including a solid state drive (SSD) according to an embodiment of the present disclosure. Referring to FIG. 10, the data processing system 2000 may include a host device 2100 and a solid state drive (SSD) 2200.

The SSD 2200 may include a controller 2210, a buffer memory device 2220, nonvolatile memory devices 2231 to 223n, a power supply 2240, a signal connector 2250, and a power connector 2260.

The controller 2210 may control an overall operation of the SSD 2200.

The buffer memory device 2220 may temporarily store data which are to be stored in the nonvolatile memory devices 2231 to 223n. Further, the buffer memory device 2220 may temporarily store data which are read out from the nonvolatile memory devices 2231 to 223n. The data temporarily stored in the buffer memory device 2220 may be transmitted to the host device 2100 or the nonvolatile memory devices 2231 to 223n according to control of the controller 2210.

The nonvolatile memory devices 2231 to 223n may be used as storage media of the SSD 2200. The nonvolatile memory devices 2231 to 223n may be coupled with the controller 2210 through a plurality of channels CH1 to CHn, respectively. One or more nonvolatile memory devices may be coupled to one channel. The nonvolatile memory devices coupled to the same channel may be coupled to the same signal bus and data bus.

The power supply 2240 may provide power PWR inputted through the power connector 2260 to the inside of the SSD 2200. The power supply 2240 may include an auxiliary power supply 2241. The auxiliary power supply 2241 may supply power to allow the SSD 2200 to be normally terminated when sudden power-off (SPO) occurs. The auxiliary power supply 2241 may include large capacity capacitors capable of charging the power PWR.

The controller 2210 may exchange a signal SGL with the host device 2100 through the signal connector 2250. The signal SGL may include a command, an address, data, and the like. The signal connector 2250 may be configured of various types of connectors according to an interface scheme between the host 2100 and the SSD 2200.

Figure 11:
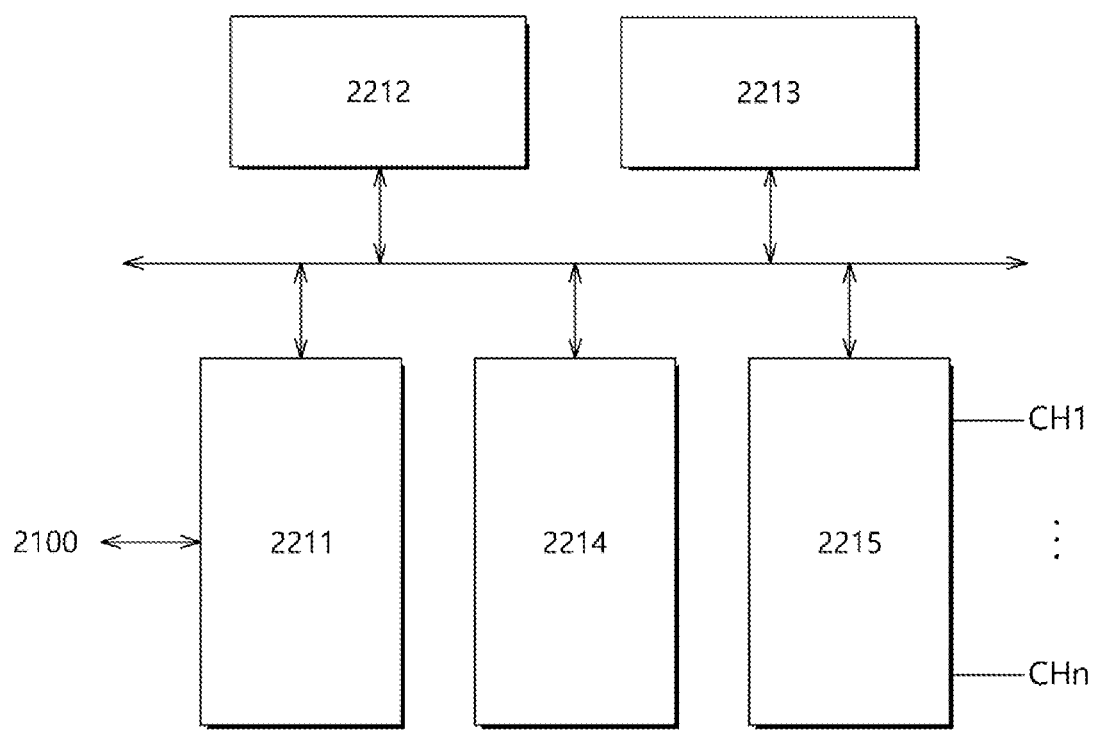
FIG. 11 is a diagram illustrating a configuration of a controller in FIG. 10.

FIG. 11 is a block diagram illustrating the controller 2210 illustrated in FIG. 10. Referring to FIG. 11, the controller 2210 may include a host interface 2211, a control unit 2212, a random access memory 2213, an error correction code (ECC) unit 2214, and a memory interface 2215.

The host interface 2211 may provide interfacing between the host device 2100 and the SSD 2200 according to a protocol of the host device 2100. For example, the host interface 2211 may communicate with the host device 2100 through one among SD, USB, MMC, embedded MMC (eMMC), PCMCIA, PATA, SATA, SCSI, SAS, PCI, PCI-e, and UFS protocols. In addition, the host interface 2211 may perform a disk emulating function of supporting the host device 2100 to recognize the SSD 2200 as a general-purpose data storage device, for example, a hard disk drive (HDD).

The control unit 2212 may analyze and process the signal SGL inputted from the host device 2100. The control unit 2212 may control operations of internal function blocks according to firmware or software for driving the SSD 2200. The random access memory 2213 may be used as a working memory for driving such firmware or software.

The ECC unit 2214 may generate parity data of data to be transmitted to the nonvolatile memory devices 2231 to 223n. The generated parity data may be stored, along with the data, in the nonvolatile memory devices 2231 to 223n. The ECC unit 2214 may detect errors of data read out from the nonvolatile memory devices 2231 to 223n based on the parity data. When the detected errors are within a correctable range, the ECC unit 2214 may correct the detected errors.

The memory interface 2215 may provide control signals such as commands and addresses to the nonvolatile memory devices 2231 to 223n according to control of the control unit 2212. The memory interface 2215 may exchange data with the nonvolatile memory devices 2231 to 223n according to control of the control unit 2212. For example, the memory interface 2215 may provide data stored in the buffer memory device 2220 to the nonvolatile memory devices 2231 to 223n or provide data read out from the nonvolatile memory devices 2231 to 223n to the buffer memory device 2220.

Figure 12:
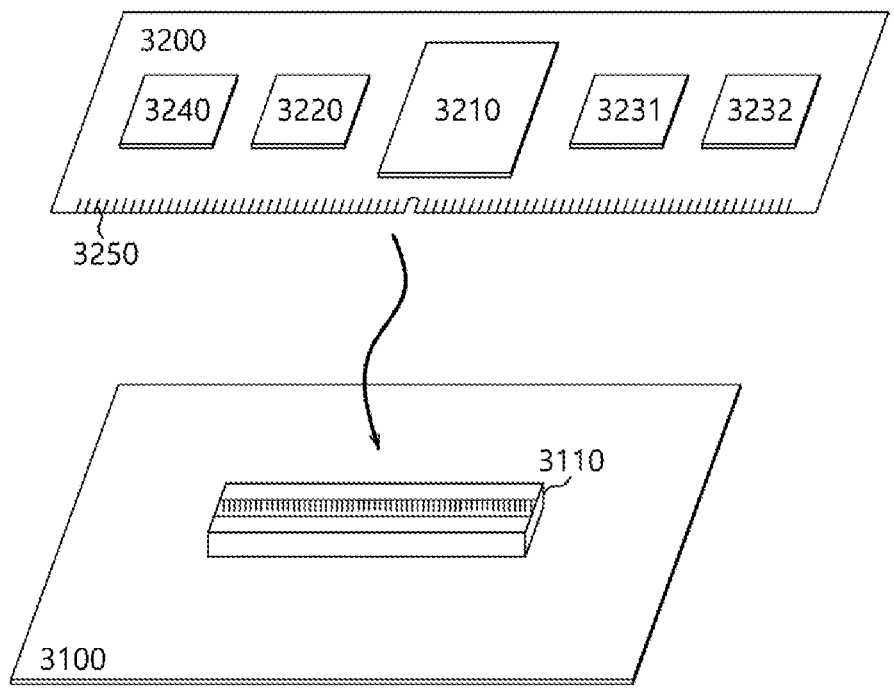
FIG. 12 is a diagram illustrating a data processing system including a data storage device according to an embodiment of the present disclosure.

FIG. 12 is a diagram illustrating a data processing system 3000 including a data storage device according to an embodiment of the present disclosure. Referring to FIG. 12, the data processing system 3000 may include a host device 3100 and a data storage device 3200.

The host device 3100 may be configured in the form of a board such as a printed circuit board. Although not shown in FIG. 12, the host device 3100 may include internal function blocks for performing functions of the host device.

The host device 3100 may include a connection terminal 3110 such as a socket, a slot or a connector. The data storage device 3200 may be mounted on the connection terminal 3110.

The data storage device 3200 may be configured in the form of a board such as a printed circuit board. The data storage device 3200 may be referred to as a memory module or a memory card. The data storage device 3200 may include a controller 3210, a buffer memory device 3220, nonvolatile memory devices 3231 and 3232, a power management integrated circuit (PMIC) 3240, and a connection terminal 3250.

The controller 3210 may control an overall operation of the data storage device 3200. The controller 3210 may be configured in the same manner as the controller 2210 shown in FIG. 11.

The buffer memory device 3220 may temporarily store data to be stored in the nonvolatile memory devices 3231 and 3232. Further, the buffer memory device 3220 may temporarily store data read out from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the data storage device 3200.

The PMIC 3240 may provide power inputted through the connection terminal 3250, to the inside of the data storage device 3200. The PMIC 3240 may manage the power of the data storage device 3200 according to control of the controller 3210.

The connection terminal 3250 may be coupled to the connection terminal 3110 of the host device 3100. Through the connection terminal 3250, signals such as commands, addresses, data and the like, and power may be transferred between the host device 3100 and the data storage device 3200. The connection terminal 3250 may be configured in various types depending on an interface scheme between the host device 3100 and the data storage device 3200. The connection terminal 3250 may be disposed on any side of the data storage device 3200.

Figure 13:
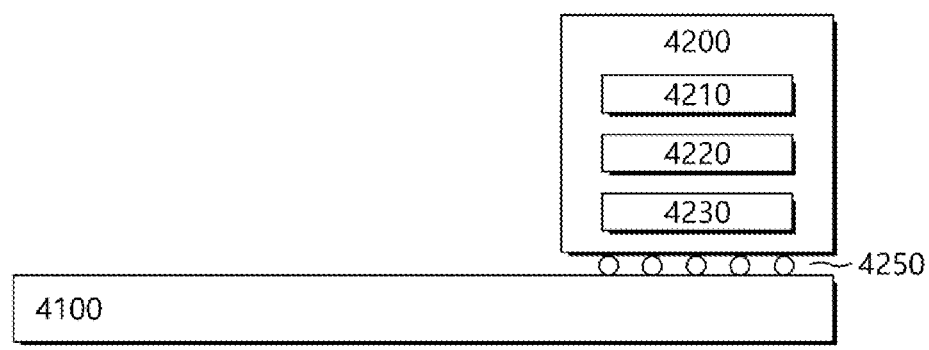
FIG. 13 is a diagram illustrating a data processing system including a data storage device according to an embodiment of the present disclosure.

FIG. 13 is a block diagram illustrating a data processing system 4000 including a data storage device according to an embodiment of the present disclosure. Referring to FIG. 13, the data processing system 4000 may include a host device 4100 and a data storage device 4200.

The host device 4100 may be configured in the form of a board such as a printed circuit board. Although not shown in FIG. 13, the host device 4100 may include internal function blocks for performing functions of the host device.

The data storage device 4200 may be configured in the form of a surface-mounting type package. The data storage device 4200 may be mounted on the host device 4100 through solder balls 4250. The data storage device 4200 may include a controller 4210, a buffer memory device 4220, and a nonvolatile memory device 4230.

The controller 4210 may control an overall operation of the data storage device 4200. The controller 4210 may be configured in the same manner as the controller 2210 shown in FIG. 11.

The buffer memory device 4220 may temporarily store data to be stored in the nonvolatile memory device 4230. Further, the buffer memory device 4220 may temporarily store data read out from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as a storage medium of the data storage device 4200.

Figure 14:
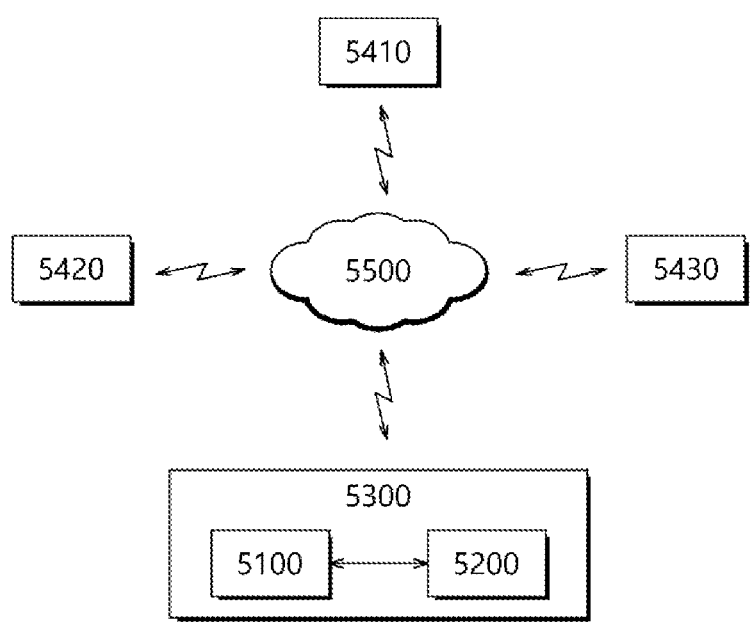
FIG. 14 is a diagram illustrating a network system including a data storage device according to an embodiment of the present disclosure.

FIG. 14 is a diagram illustrating a network system 5000 including a data storage device according to an embodiment of the present disclosure. Referring to FIG. 14, the network system 5000 may include a server system 5300 and a plurality of client systems 5410 to 5430 which are coupled to each other through a network 5500.

The server system 5300 may service data in response to requests from the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host device 5100 and a data storage device 5200. The data storage device 5200 may be configured of the data storage device 10 illustrated in FIG. 1, the data storage device 2200 illustrated in FIG. 10, the data storage device 3200 illustrated in FIG. 12, or the data storage device 4200 illustrated in FIG. 13.

Figure 15:
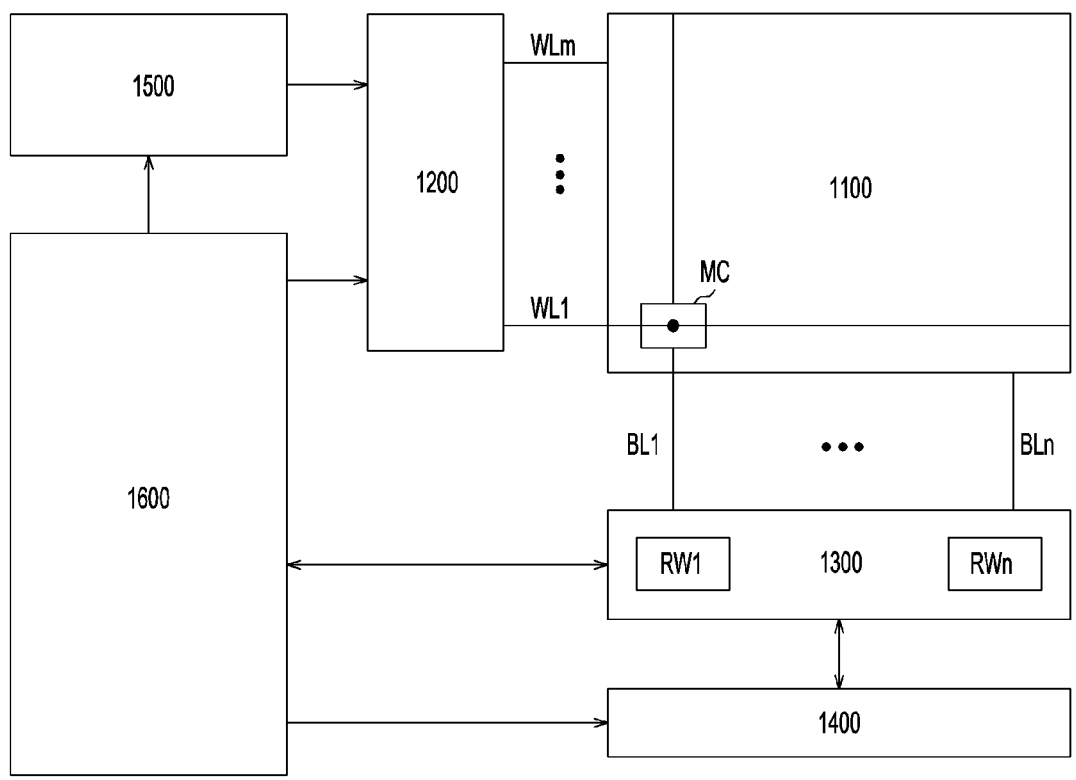
FIG. 15 is a diagram illustrating a configuration of a nonvolatile memory device included in a data storage device according to an embodiment of the present disclosure.

FIG. 15 is a block diagram illustrating a nonvolatile memory device 1000 included in a data storage device according to the embodiment of the present disclosure. Referring to FIG. 15, the nonvolatile memory device 1000 may include a memory cell array 1100, a row decoder 1200, a data read/write block 1300, a column decoder 1400, a voltage generator 1500, and a control logic 1600.

The memory cell array 1100 may include the memory cells MC which are arranged in regions where word lines WL1 to WLm and bit lines BL1 to BLn cross each other.

The row decoder 1200 may be coupled with the memory cell array 1100 through the word lines WL1 to WLm. The row decoder 1200 may operate according to control of the control logic 1600. The row decoder 1200 may decode addresses provided from an external device (not shown). The row decoder 1200 may select and drive the word lines WL1 to WLm, based on the decoding results. For example, the row decoder 1200 may provide word line voltages provided from the voltage generator 1500, to the word lines WL1 to WLm.

The data read/write block 1300 may be coupled with the memory cell array 1100 through the bit lines BL1 to BLn. The data read/write block 1300 may include read/write circuits RW1 to RWn corresponding to the bit lines BL1 to BLn. The data read/write block 1300 may operate according to control of the control logic 1600. The data read/write block 1300 may operate as a write driver or a sense amplifier according to an operation mode. For example, the data read/write block 1300 may operate as a write driver which stores data provided from the external device, in the memory cell array 1100 in a write operation. In another example, the data read/write block 1300 may operate as a sense amplifier which reads out data from the memory cell array 1100 in a read operation.

The column decoder 1400 may operate according to control of the control logic 1600. The column decoder 1400 may decode addresses provided from the external device. The column decoder 1400 may couple data input/output lines (or data input/output buffers) with the read/write circuits RW1 to RWn of the data read/write block 1300 which respectively correspond to the bit lines BL1 to BLn, based on decoding results.

The voltage generator 1500 may generate voltages to be used in internal operations of the nonvolatile memory device 1000. The voltages generated by the voltage generator 1500 may be applied to the memory cells MC of the memory cell array 1100. For example, a program voltage generated in a program operation may be applied to a word line of memory cells on which the program operation is to be performed. In another example, an erase voltage generated in an erase operation may be applied to a well region of memory cells on which the erase operation is to be performed. In still another example, a read voltage generated in a read operation may be applied to a word line of memory cells on which the read operation is to be performed.

The control logic 1600 may control an overall operation of the nonvolatile memory device 1000, based on control signals provided from the external device. For example, the control logic 1600 may control operations of the nonvolatile memory device 1000 such as read, write, and erase operations of the nonvolatile memory device 1000.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

When implemented in at least partially in software, the controllers, processors, devices, modules, units, multiplexers, generators, logic, managers, interfaces, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

The above described embodiments of the present invention are intended to illustrate and not to limit the present invention. Various alternatives and equivalents are possible. The invention is not limited by the embodiments described herein. Nor is the invention limited to any specific type of semiconductor device. Other additions, subtractions, or modifications which are apparent in view of the present disclosure are intended to fall within the scope of the appended claims.

What is claimed is:

1. A data storage device comprising:
    a nonvolatile memory device which includes a first nonvolatile memory group including a plurality of first nonvolatile memories coupled to a first flash translation layer (FTL) core and a second nonvolatile memory group including a plurality of second nonvolatile memories coupled to a second FTL core; and
    a controller,
    wherein the controller includes:
    a protocol core configured to receive a command from a host device and distribute the command to one of the first FTL core and the second FTL core,
    the first FTL core configured to write first user data from the host device and second metadata in one among the plurality of first nonvolatile memories, and the second metadata is related to second user data stored in the plurality of second nonvolatile memories; and
    a common memory configured to store data transmitted from the first FTL core and the second FTL core.

2. The data storage device of claim 1, wherein the controller further includes the second FTL core configured to write the second user data from the host device and the first metadata in one among the plurality of second nonvolatile memories, and the first metadata is related to the first user data.

3. The data storage device of claim 2, wherein the common memory includes:
    a first common memory configured to store the first metadata transmitted from the first FTL core; and
    a second common memory configured to store the second metadata transmitted from the second FTL core.

4. The data storage device of claim 3, wherein the common memory further includes:
    a first common queue configured to store a write request message of the first metadata; and
    a second common queue configured to store a write request message of the second metadata.

5. The data storage device of claim 4, wherein each of the write request message of the first metadata and the write request message of the second metadata includes a counting number for identifying an occurrence of new metadata.

6. The data storage device of claim 5, wherein the first FTL core checks the counting number of the write request message of the second metadata stored in the second common queue every set time, and receives, from the second common memory, the second metadata matching to a changed counting number and the second metadata matching to a previous counting number of non-written second metadata prior to the changed counting number and writes the second metadata in one among the plurality of first nonvolatile memories when it is checked that the counting number is changed as a check result, and
    wherein the second FTL core checks the counting number of the write request message of the first metadata stored in the first common queue every set time, and receives, from the first common memory, the first metadata matching to a changed counting number and the first metadata matching to a previous counting number of non-written first metadata prior to the changed counting number and writes the first metadata in one among the plurality of second nonvolatile memories when it is checked that the counting number is changed as a check result.

7. The data storage device of claim 3, further comprising:
    a first message queue configured to, when a write request message of the first metadata is stored, generate a write request interrupt and transmit the write request interrupt to the second FTL core; and
    a second message queue configured to, when a write request message of the second metadata is stored, generate a write request interrupt and transmit the write request interrupt to the first FTL core.

8. The data storage device of claim 3, wherein the common memory further includes a common queue configured to store a write request message of the first metadata and a write request message of the second metadata by matching with identification information for identifying the write request message of the first metadata and the write request message of the second metadata.

9. The data storage device of claim 2, further comprising a common queue configured to store a write request message of the first metadata transmitted from the first FTL core and a write request message of the second metadata transmitted from the second FTL core by matching with identification information for identifying the write request message of the first metadata and the write request message of the second metadata.

10. The data storage device of claim 2, wherein the first FTL core transmits a write done message of the second metadata to the second FTL core when write of the second metadata is completed, and
wherein the second FTL core transmits a write done message of the first metadata to the first FTL core when write of the first metadata is completed.

11. The data storage device of claim 1, wherein when a read command is received from the host device, the protocol core allows one of the first FTL core and the second FTL core to execute the read command based on a physical address in which user data corresponding to the read command is stored.

12. The data storage device of claim 11, wherein the first FTL core requests the first metadata corresponding to the read command to the second FTL core when the read command is received, and
wherein the second FTL core requests the second metadata corresponding to the read command to the first FTL core when the read command is received.

13. An operating method of a data storage device comprising:
writing, by a first flash translation layer (FTL) core, first user data transmitted from a host device in one of a plurality of first nonvolatile memories;
writing, by the first FTL core, first metadata related to the first user data in a common memory; and
writing, by a second FTL core, the first metadata in one of a plurality of second nonvolatile memories.

14. The method of claim 13, wherein the writing of the first metadata in the common memory further includes writing, by the first FTL core, a write request message of the first metadata in the common memory.

15. The method of claim 14, wherein the write request message of the first metadata includes a counting number for identifying an occurrence of new metadata.

16. The method of claim 15, further comprising: after the writing of the first metadata in the common memory and before the writing of the first metadata in the one among the plurality of second nonvolatile memories,
checking, by the second FTL core, the counting number of the write request message of the first meta data stored in the common memory after a set time; and
receiving, by the second FTL core, the first metadata matching to a changed counting number and the first metadata matching to a previous counting number of non-written first metadata prior to the changed counting number from the common memory when the counting number is changed as a check result.

17. The method of claim 14, further comprising: after the writing of the first metadata in the common memory and before the writing of the first metadata in the one among the plurality of second nonvolatile memories,
storing the write request message of the first metadata transmitted from the first FTL core in a message queue;
generating a write request interrupt for the write request message of the first metadata and transmitting the write request interrupt to the second FTL core; and
receiving the first metadata from the common memory.

18. The method of claim 13, further comprising, after the writing of the first metadata in the one among the plurality of second nonvolatile memories, transmitting, by the second FTL core, a write done message of the first metadata to the first FTL core.

19. A data storage device comprising:
a nonvolatile memory device including a plurality of first nonvolatile memories and a plurality of second nonvolatile memories; and
a controller including:
a first flash translation layer (FTL) core configured to write first user data from a host device in one of the plurality of first nonvolatile memories;
a second FTL core configured to write second user data from the host device in one of the plurality of second nonvolatile memories; and
a common memory configured to store first meta associated with the first user data,
wherein the first FTL core is configured to transmit a meta write request message to the second FTL core, and
wherein the second FTL core is configured to write the first meta in one of the plurality of second nonvolatile memories in response to the meta write request message and transmit a meta write done message to the first FTL core after the first meta is written in one of the plurality of second nonvolatile memories.

* * * * *